United States Patent [19]

Wendler

[11] Patent Number: 4,470,762
[45] Date of Patent: Sep. 11, 1984

[54] DEMAND RESPONSIVE HYDRAULIC PUMP

[75] Inventor: Paul O. Wendler, Saginaw, Mich.

[73] Assignee: General Motors Corporation, Detroit, Mich.

[21] Appl. No.: 473,616

[22] Filed: Mar. 9, 1983

[51] Int. Cl.³ .................. F04B 49/02; F04B 49/08
[52] U.S. Cl. ................................ 417/283; 417/299; 417/310
[58] Field of Search ............... 417/283, 284, 299, 310

[56] References Cited

U.S. PATENT DOCUMENTS

| | | | |
|---|---|---|---|
| 2,193,244 | 3/1940 | Wolcott | 417/299 |
| 2,362,724 | 11/1944 | Shea | 417/299 X |
| 3,930,759 | 1/1976 | Drutchas | 417/283 |

Primary Examiner—Richard E. Gluck
Attorney, Agent, or Firm—Donald F. Scherer

[57] ABSTRACT

A hydraulic power steering system has a vane type pump which is operable to supply fluid to a power steering gear at a volumetric rate determined in part by the system pressure or system demand. The flow from the pumping chambers is partially bypassed through a bypass passage formed between the cam ring and the pump thrust plate. The bypass passage is urged to the open position by a bypass spring which urges separation between the cam ring and the thrust plate. The pressure plate of the pump responds to system pressure or demand to urge the cam ring into abutment with the thrust plate thereby reducing the opening and decreasing the bypass flow.

1 Claim, 1 Drawing Figure

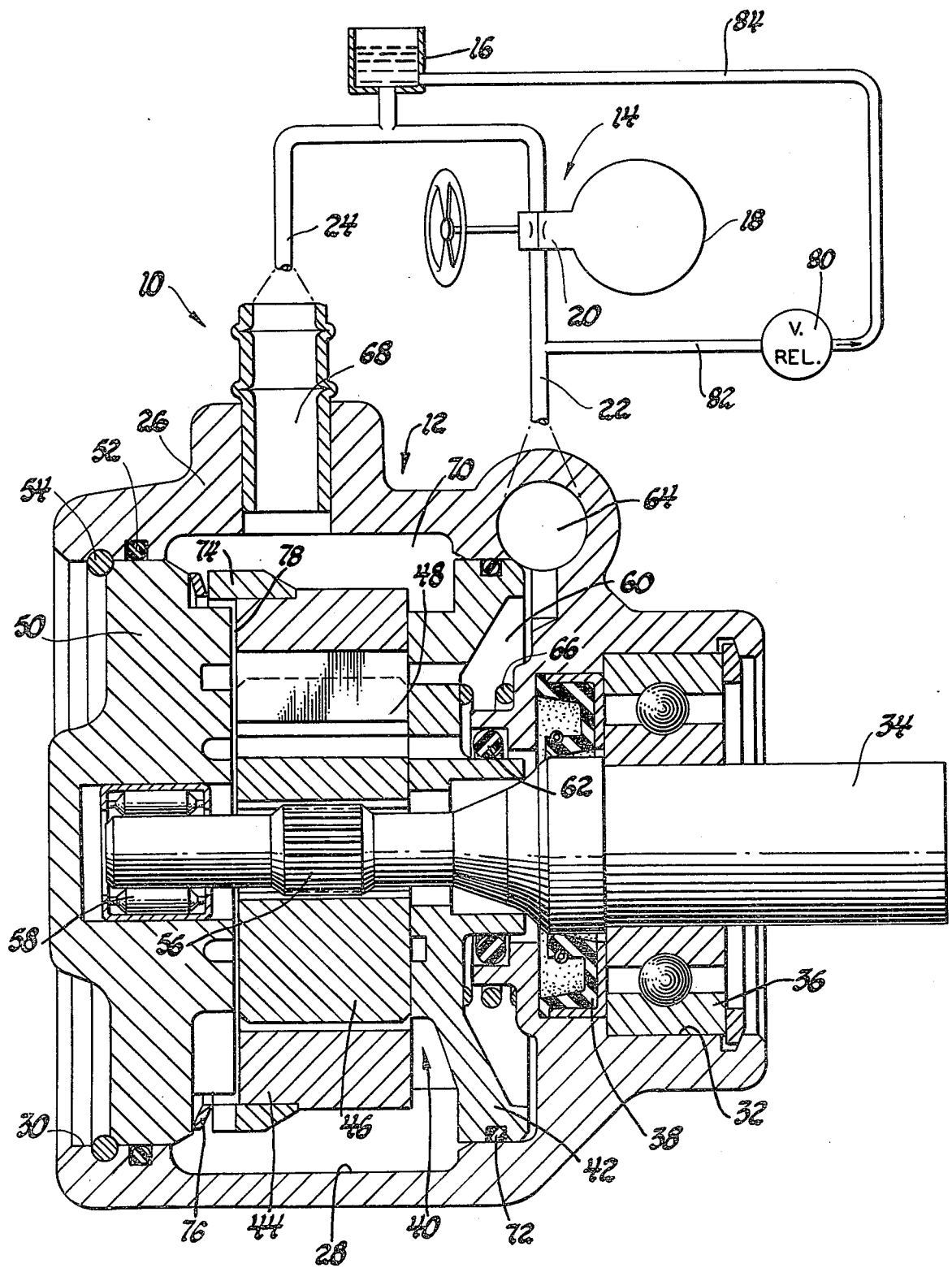

DEMAND RESPONSIVE HYDRAULIC PUMP

This invention relates to vane type hydraulic pumps and more particularly to such pumps having means incorporated therein to provide a demand responsive discharge flow.

When a vehicle is equipped with a power steering system, the hydraulic pump is a parasitic loss within the system whenever a turning maneuver is not occurring. Many efforts have been made to reduce these losses. These efforts have generally resulted in the use of flow controlled type pumps which limit the fluid volume delivered to the steering gear thereby limiting the back pressure within the system.

The present invention seeks to reduce the losses by reducing the flow to the steering gear whenever a steering demand is not present. When a steering demand becomes present, the system will discharge the fluid required to satisfy the demand with the remaining fluid being bypassed. This differs from a flow controlled system in that the flow to the steering gear is continually limited regardless of demand.

It is an object of this invention to provide an improved vane type power steering pump having a pair of end plates with a cam ring sandwiched therebetween wherein the cam ring and one end plate are urged to separate by a bypass spring member such that the plate and cam ring cooperate to form a bypass valve system and wherein the other end plate in response to system discharge pressure, urges the cam ring and one end plate into abutting relationship to close off the bypass flow.

This and other objects and advantages of the present invention will be more apparent from the following description and drawing which is a cross-sectional elevational view of a vane type hydraulic pump disposed in the power steering system shown in diagrammatic representation.

The power steering system 10 includes a vane type hydraulic pump, generally designated 12, a steering gear assembly, generally designated 14, and a fluid reservoir 16. The steering gear assembly 14 includes a power-assisted steering gear 18 and a steering valve 20. The steering gear assembly 14 may be constructed in accordance with the steering gear assembly shown in Zeigler U.S. Pat. No. 3,022,772 issued Feb. 27, 1962, and assigned to the assignee of this application.

The vane type pump 12 is connected through a pump discharge passage 22 to the steering valve 20 such that pressurized fluid from the pump 12 is delivered to the steering gear assembly 14. The steering valve 20 and reservoir 16 are both connected to the pump 12 through a pump return or inlet passage 24.

The vane type pump 12 includes a pump housing 26 having an internal housing cavity 28 with a large opening 30 at one end thereof and a smaller opening 32 at the other end thereof. A drive shaft 34 extends through the smaller opening 32 and is rotatably supported in a shaft bearing 36 which is secured in the opening 32 and is contacted by a shaft seal 38 also secured in the opening 32. The shaft seal 38 functions to prevent atmospheric air from entering the pump and low pressure fluid leakage from the pump.

The housing cavity 28 is substantially filled with a vane pump assembly, generally designated 40, and including a pressure plate 42, a cam ring 44, a rotor 46, a plurality of vanes 48 and an end cover and thrust plate 50. The end cover and thrust plate 50 cooperates with an annular seal ring 52 and a locking ring 54 to close the large opening 30.

The rotor 46 includes a plurality of slots in which the vanes 48 are slidably disposed in a well-known manner. The vanes 48 contact the inner surface of cam ring 44 so as to provide a plurality of peripheral pumping chambers which expand and contract upon the rotation of rotor 46 when it is driven through a spline connection 56 by the drive shaft 34.

The end cover and thrust plate 50 and pressure plate 42 establish the axial limits of the peripheral pump chambers and also includes pump inlet and discharge porting arrangements disposed in a well-known manner. The end cover and thrust plate 50 supports a shaft bearing 58 in which is rotatably supported the left end of drive shaft 34.

The discharge from the pumping chambers of the vane pump assembly 40 passes through pressure plate 42 to a discharge space 60 formed between the right end of cavity 28 and the left end surface of pressure plate 42. Leakage to the drive shaft 34 from the discharge space 60 is prevented by an annular seal ring 62. The discharge space 60 is in fluid communication with a pump discharge port 64 which in turn is in fluid communication with the pump discharge passage 22.

To ensure that the vane pump assembly 40 is urged into abutment with the locking ring 54, an assist spring 66 disposed in the discharge space 60 is provided. Thus, even at atmospheric pressure within the discharge space 60 there is a leftward force provided which continually urges the pump vane assembly toward the locking ring 54.

The pump inlet passage 24 is connected with a pump inlet port 68 which in turn communicates with an inlet space 70 which surrounds the cam ring 44 in the housing cavity 28. The inlet space 70 communicates fluid from the return passage 24 to the inlet porting of the vane pump assembly 40. The inlet space 70 is sealed from direct communication with the discharge space 60 by an annular seal ring 72 disposed in the pressure plate 42.

The cam ring 44 has secured to the outer circumference thereof a bypass sleeve 74 which partly surrounds a portion of the outer circumference of the thrust plate 50. A washer type bypass spring 76 is disposed between the thrust plate 50 and the bypass sleeve 74 to urge separation between the cam ring 44 and the thrust plate 50. This separation creates a bypass passage 78 which permits direct fluid communication between the pumping chambers of the vane type pump 40 and the inlet space 70.

At low operating pressures, for example, when no steering maneuver is being made, a portion of the discharge from the pumping chambers will pass to the inlet space 70 through the bypass passage 78. The remainder of the discharge flow will be delivered to the passage 22 and from there through the steering gear assembly 14.

If a steering maneuver is made by the operator, the pressure in discharge passage 22 and discharge space 60 will increase. An increase in the pressure in discharge space 60 will urge the pressure plate 42 leftward. When the pressure in discharge space 60 is sufficient, the leftward force on pressure plate 42 will overcome the force in bypass spring 76 resulting in a closing of the bypass passage 78. As the bypass passage 78 is closed, an increase in the amount of pump discharge flow to passage 22 will occur.

The cam ring 44, thrust plate 50 and spring 76 cooperate to form a bypass valve. This bypass valve is operated by the fluid pressure acting on the pressure plate 42. This valve mechanism does not provide for system relief pressure. Accordingly, a conventional pressure relief valve 80 is provided to limit the maximum system pressure which can be obtained in discharge passage 22.

As seen, the pressure relief valve 80 has an inlet passage 82 connected to passage 22 and an outlet passage 84 connected to the reservoir.

The embodiments of the invention in which an exclusive property or privilege is claimed are defined as follows:

1. A demand responsive hydraulic fluid pump for a power steering system comprising; outlet port means for delivering pressurized fluid to the system; inlet port means for returning fluid from the system; vane pump means including a rotor, a cam ring and a plurality of extendable vane means for forming a plurality of expansible pump chambers for transferring fluid from said inlet port to said outlet port; a pair of end plate means for closing the axial ends of said pump chambers, one of said end plate means being responsive to the fluid pressure at said outlet port means; and spring means disposed between said cam ring and the other end plate means to cause separation therebetween for bypassing fluid from said outlet means to said inlet means, said one end plate means being responsive to the system pressure to cause the separation between said cam ring and said other end plate means to be reduced when the system demand pressure increases.

* * * * *